United States Patent
Chang et al.

(10) Patent No.: US 11,173,422 B2
(45) Date of Patent: Nov. 16, 2021

(54) CARBONATION REDUCTION SYSTEMS AND METHODS

(71) Applicant: PepsiCo, Inc., Purchase, NY (US)

(72) Inventors: Samuel Chang, Hawthorne, NY (US); John Eaton, Purchase, NY (US); Maher Nachawati, Stamford, CT (US); William Segiet, Bethel, CT (US); Vasily Abashkin, Saint Petersburg (RU); Andrey Balanev, Saint Petersburg (RU); Petr Egoyants, Saint Petersburg (RU); Mikhail Verbitsky, Stoughton, MA (US)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 16/499,107

(22) PCT Filed: Mar. 16, 2018

(86) PCT No.: PCT/US2018/022913
§ 371 (c)(1),
(2) Date: Sep. 27, 2019

(87) PCT Pub. No.: WO2018/182999
PCT Pub. Date: Oct. 4, 2018

(65) Prior Publication Data
US 2020/0023292 A1      Jan. 23, 2020

Related U.S. Application Data

(63) Continuation of application No. 15/476,537, filed on Mar. 31, 2017, now Pat. No. 10,328,362.

(51) Int. Cl.
*B01D 19/00*     (2006.01)
*B67D 1/00*     (2006.01)
(Continued)

(52) U.S. Cl.
CPC ............ *B01D 19/0036* (2013.01); *A23L 2/76* (2013.01); *B67D 1/0021* (2013.01);
(Continued)

(58) Field of Classification Search
CPC ..... B01D 19/0036; A23L 2/76; B67D 1/0021; B67D 1/0044; B67D 1/1252; A23V 2002/00
See application file for complete search history.

(56) References Cited

U.S. PATENT DOCUMENTS 1,516,190 A    11/1924   Holderle et al.
2,645,380 A    7/1953    Donnelly
(Continued)

FOREIGN PATENT DOCUMENTS

GB          962559 A       7/1964

OTHER PUBLICATIONS

International Application No. PCT/US2018/22913—International Search Report dated Jun. 14, 2018.
(Continued)

*Primary Examiner* — J C Jacyna
(74) *Attorney, Agent, or Firm* — Sterne, Kessler, Goldstein & Fox P.L.L.C.

(57) ABSTRACT

A beverage dispensing valve may include an inlet to receive carbonated water, a nozzle shell, and an outlet downstream of the nozzle shell configured to dispense a finished beverage. The nozzle shell may include an aperture open to ambient pressure environment. A method for dispensing a beverage may include flowing carbonated water through an inlet of a beverage dispensing valve, lowering the pressure of the carbonated water sufficient to promote carbon dioxide nucleation, flowing the carbonated water through a chamber vented to environment such that a portion of carbon dioxide nucleated is off-gassed, and introducing a beverage ingre-
(Continued)

dient when the carbonated water reaches a sufficiently low carbonation level. A beverage dispensing nozzle may include an inlet configured to receive carbonated water from a beverage dispensing valve, a nozzle shell including an aperture open to ambient pressure environment, and an outlet downstream of the nozzle shell configured to dispense a finished beverage.

14 Claims, 13 Drawing Sheets

(51) Int. Cl.
  *A23L 2/76* (2006.01)
  *B67D 1/12* (2006.01)
(52) U.S. Cl.
  CPC ......... *B67D 1/0044* (2013.01); *B67D 1/1252* (2013.01); *A23V 2002/00* (2013.01)

(56) References Cited

U.S. PATENT DOCUMENTS

| | | | |
|---|---|---|---|
| 3,286,935 A | 11/1966 | Corlett et al. | |
| 3,584,762 A | 6/1971 | Vantroba et al. | |
| 3,727,844 A * | 4/1973 | Bencic | B67D 1/0048 239/414 |
| 3,966,091 A | 6/1976 | Bencic | |
| 4,266,726 A * | 5/1981 | Brown | B67D 1/0085 239/406 |
| 4,445,781 A * | 5/1984 | Arena | B01F 3/0876 366/154.1 |
| 4,986,447 A * | 1/1991 | McCann | B67D 1/0044 222/129.1 |
| 5,048,726 A * | 9/1991 | McCann | B67D 1/0044 222/129.1 |
| 5,203,474 A * | 4/1993 | Haynes | B67D 1/0044 222/129.1 |
| 6,253,963 B1 * | 7/2001 | Tachibana | B67D 1/0044 222/129.1 |
| 2006/0097009 A1 * | 5/2006 | Bethuy | B67D 1/0021 222/129.1 |
| 2012/0228328 A1 * | 9/2012 | Ryan | B67D 1/0025 222/129.4 |
| 2018/0022594 A1 | 1/2018 | Randall et al. | |
| 2019/0275478 A1 * | 9/2019 | Jersey | B01F 15/0234 |

OTHER PUBLICATIONS

Extended European Search Report in EP18775666.3, dated Dec. 11, 2020, 9 pages.

* cited by examiner

CARBONATION REDUCTION SYSTEMS AND METHODS

FIELD

The described embodiments relate generally to a beverage dispenser. In particular, embodiments relate to beverage dispensing valve, as well as beverage dispensing nozzle systems and methods used in a beverage dispenser, in order to reduce carbonation in a finished beverage.

BACKGROUND

Various systems and methods for carbonation reduction may be used.

SUMMARY

Some embodiments are directed to a beverage dispensing valve, including an inlet configured to receive carbonated water, a nozzle shell including an aperture open to ambient pressure environment, and an outlet downstream of the nozzle shell configured to dispense a finished beverage. In some embodiments, nozzle shell includes a nozzle shell chamber. Nozzle shell chamber may be configured to receive carbonated water from the inlet after passing through a diffuser, such that the pressure drop between the inlet and nozzle shell chamber is between about 5 gage pounds per square inch (psig) and 45 gage psig.

In some embodiments, the nozzle shell chamber may be configured to receive carbonated water from the inlet and allow carbon dioxide to vent to ambient pressure environment through the aperture.

In some embodiments, the aperture is disposed along a portion of a perimeter of the valve. In some embodiments, the aperture is disposed substantially around the entire perimeter of the valve. In some embodiments, a dimension of the aperture is adjustable. In some embodiments, the cross-sectional area of the aperture is adjustable. In some embodiments, the aperture has an open configuration and a closed configuration.

In some embodiments, the nozzle shell includes a deflection member configured to prevent liquid from being vented through the aperture.

In some embodiments, the valve includes a diffuser upstream of the nozzle shell configured to raise the pressure of the carbonated water such that it experiences a pressure drop when flowing into a nozzle shell chamber.

Some embodiments are directed to a method for dispensing a beverage. In some embodiments, the method includes flowing carbonated water through an inlet of a beverage dispensing valve, lowering the pressure of the carbonated water sufficiently fast to promote carbon dioxide nucleation, flowing the carbonated water through a chamber vented to ambient pressure environment such that a portion of carbon dioxide nucleated is off-gassed, and introducing a beverage ingredient when the carbonated water reaches a sufficiently low carbonation level.

In some embodiments, the carbonation level is between about 1 gas volumes and 4.2 gas volumes. As used herein, one gas volume equals the volume of carbon dioxide gas at 0° C. (32° F.) and 1 atmosphere pressure that will dissolve in an equal volume of liquid. In some embodiments, the chamber vented to ambient pressure environment is disposed in a portion of a beverage nozzle. In some embodiments, lowering the pressure of the carbonated water is effected by passing the carbonated water through a diffuser and into the chamber vented to ambient pressure environment. In some embodiments, the carbon dioxide nucleated is off-gassed through an aperture disposed in a portion of a beverage nozzle.

Some embodiments are directed to a beverage dispensing nozzle, including an inlet configured to receive carbonated water from a beverage dispensing valve, a nozzle shell including an aperture open to ambient pressure environment, and an outlet downstream of the nozzle shell configured to dispense a finished beverage.

In some embodiments, the nozzle shell includes a nozzle shell chamber, configured to receive carbonated water from the inlet and allow carbon dioxide to vent to ambient pressure environment through the aperture. In some embodiments, the aperture is disposed along a portion of a perimeter of the nozzle. In some embodiments, the aperture is disposed substantially around the entire perimeter of the nozzle. In some embodiments, the nozzle includes an interface region configured to couple to a beverage dispensing valve.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
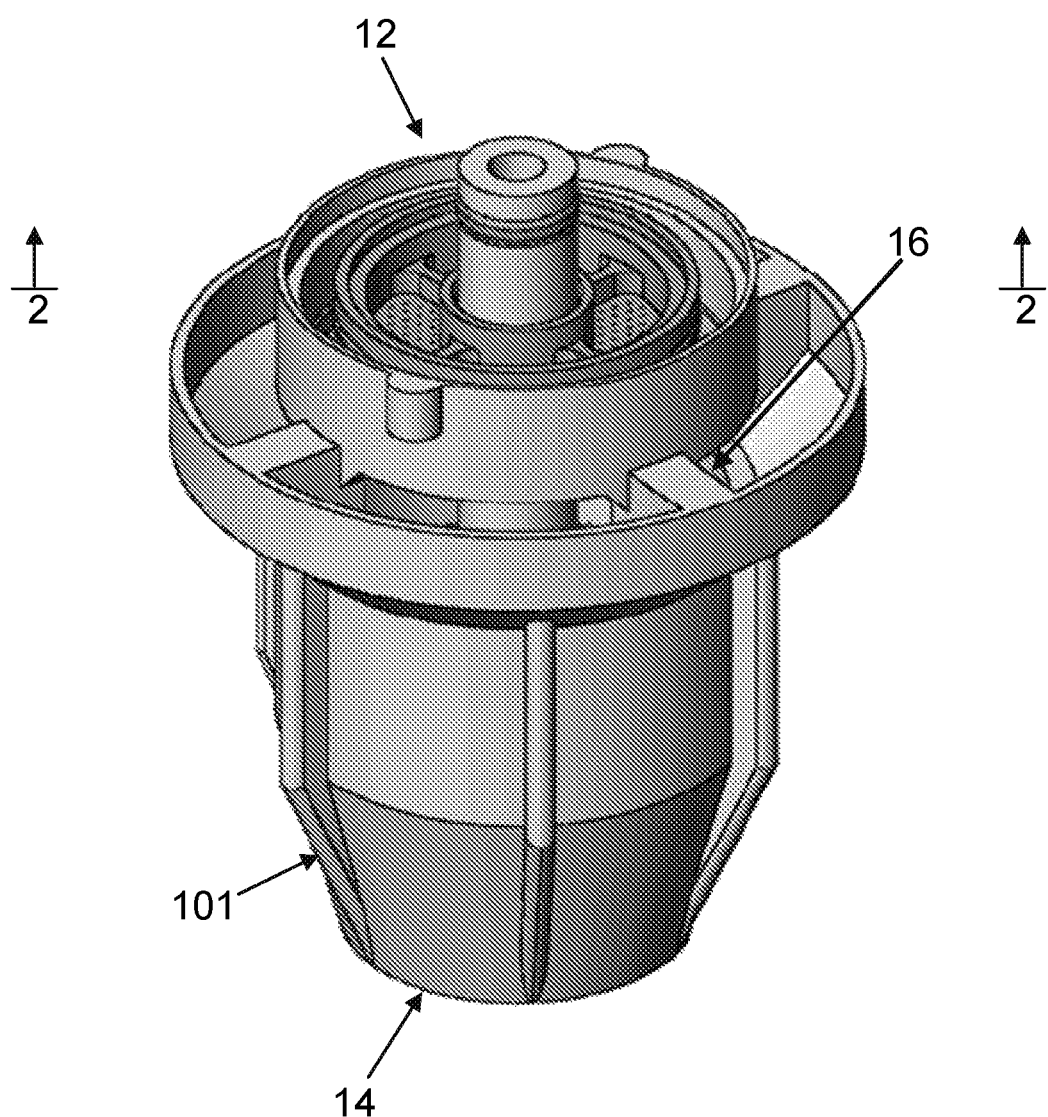
FIG. 1 shows a perspective view of a beverage dispensing nozzle according to an embodiment.

The present invention(s) will now be described in detail with reference to embodiments thereof as illustrated in the accompanying drawings. References to "one embodiment", "an embodiment", "an exemplary embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Beverage dispensing units have become a popular way for food and beverage establishments to create on-site fountain beverages. Typically, these units include several bag-in-box containers that each contains syrup, a liquid source that dispenses a liquid, a mixing unit, and a dispensing unit. Syrup is pumped from the bag-in-box container into the mixing unit where it is mixed with liquid to form a beverage that is then dispensed through the dispensing unit. Typically, a pump causes the syrup to be released from the bag-in-box container into the mixing unit.

Conventional beverage dispensing units and systems position the bag-in-box containers and the pump in a back room, such as a storage room or food preparation area, because they can be noisy and can be distracting to patrons. The dispensing unit is oftentimes positioned in the foodservice area of the restaurant or bar so that staff and/or patrons may have access to it. This unit is time-consuming to assemble, disassemble, and service because it is positioned in multiple rooms and because portions of the unit are difficult to access. Assembly, disassembly, and service of this beverage dispensing unit are oftentimes performed by a highly skilled technician due to the complex nature of the unit.

Many carbonated and noncarbonated beverages are available on the market and are in demand. For example, restaurants, cafeterias, fast food facilities, and the like often utilize beverage dispensers to provide such beverages to their customers (either from behind the counter or self-serve). These dispensers often used "post-mix" beverage dispensing valves, which use two separate flow paths to dispense water (carbonated or non-carbonated, depending on the type of beverage) and syrup into a cup, in which the water and syrup mix to produce a beverage. Alternatively, "pre-mix" dispensers may dispense pre-mixed beverages.

Typically, post-mix beverage dispensing valves dispense only one beverage flavor per valve. The number of these "one-flavor" valves that a dispenser can accommodate is limited, and thus the valves are assigned to the most popular flavors, typically carbonated beverages (cola, diet cola, lemon-lime, root beer, etc.). Additional noncarbonated beverage flavors (e.g., iced tea, lemonade, pink lemonade, fruit punch, raspberry iced tea, etc.), require additional dispensers. In many cases, these dispensers are dedicated to a single flavor, to prevent mixing flavors between beverage dispensing cycles. This takes up additional counter space, and increases beverage dispensing cost.

For beverage dispensers, carbonation levels are generally predetermined. For example, a predetermined level may be set such that still water and carbonated water may be mixed with a proportioning valve before being dispensed. In some instances, the proportion of plain water and carbonated water can be controlled to dispense the desired level of carbonation. This leads to problems where the dispensing valves are calibrated to a single, relatively high particular carbonation level, which may be too high for certain flavor profiles. For example, if a dispensing valve is set for a high-carbonation level cola, the flavor profile of a sparkling water, sparkling tea, etc., will be adversely affected if dispensed from the high carbonation valve. Due to the complicated nature of the dispensing units and systems, carbonation levels are generally set to a single, relatively high, level, and are not adjustable.

A particular beverage company's carbonated soft drink portfolio may encompass a range of carbonation levels (e.g., between about 1 and 4.2 gas volumes). In packaged soft drinks (e.g., bottle or can beverage), this carbonation level control may be controlled in a manufacturing plant. However, as described above, carbonation level is not easy to control in dispenser unit applications. As such, a solution for a beverage dispensing nozzle, such as a retrofit beverage dispensing nozzle, is desirable such that a nozzle may reduce the carbonation level of its carbonated water source and in turn dispense a beverage (e.g., soft drink) at a lower carbonation level.

The present disclosure details embodiments of a beverage dispensing nozzle, for example, to be installed on fountain dispenser valves which dispense low carbonation beverages. For example, a service technician may be able to perform a quick and simple replacement of the existing nozzle with the new nozzle in the field, without complicated installation or cutting into feed lines of the system. Advantageously, consumers will then be able to enjoy their soft drink at the brand appropriate carbonation specification. Alternatively, dispensers could be manufactured with the lower carbonation beverage dispensing nozzle, with appropriate adaptation for use in the field such that high carbonation level beverages are not dispensed from the low carbonation level nozzle.

Advantageously, embodiments of the beverage dispensing nozzle of the present disclosure would not require a major alteration to the existing dispensing system. For example, no re-design of the carbonation engine is required. Additionally, cutting into product feed lines (which requires de-pressurization of the fountain equipment in order to install in the field) is not required. The beverage dispensing nozzle of the present disclosure may have a similar footprint to existing beverage dispensing nozzles, and thus does not alter the look or function of the dispenser.

Embodiments of the present disclosure utilize one or more strategies to decrease carbonation, including promoting rapid pressure drop in the carbonated water flow to promote nucleation of $CO_2$ bubbles; increased carbonated water flow residence time within the nozzle to encourage $CO_2$ diffusion into the bubbles; and augmented passage to ambient atmospheric conditions for the evacuation of $CO_2$ bubbles. Thus, the carbonation level is reduced to a substantially lower value which is suitable for low carbonated soft drinks, sparkling waters, sparkling teas, etc. Advantageously, the new nozzle or nozzle retrofit design has a footprint similar to existing nozzles, and may be configured to be fully interchangeable with regular nozzle, which allows existing valves (e.g., "Legacy Dispenser Valves," such as those of UFB Valve, IMI Cornelius, Inc., and the like) to be easily retrofitted to enable the low carbonated drink dispensing capability.

Further, a company may provide limited time offer ("LTO") beverage products in bottle and cans. It may offer a refreshing new flavor for a limited time allowing incremental volume through the generation of interest in something new and novel. In some instances, a unique carbonation level may be a feature of a LTO beverage product.

Restricting access to certain products may drive demand, and can be advantageous for a company. Due to the infrastructure and nature of the systems, sometimes it is less desirable to provide for LTOs in a food and beverage setting (e.g., restaurant, convenience store, grocery, or the like) due to the changeover cost and equipment replacement. A rotating dispenser offering an LTO may require components such as the syrup line to be replaced to avoid flavor cross-contamination from previous syrup flavors run through the line. Standard post mix systems can generally only dispense syrup products that are pumped through a line. A time intensive and complicated changeover is required to change flavors and flavor carryover becomes a risk when switching from pungent flavors to lighter flavors which necessitates line changes.

Further, identifying a particular carbonation level may be a challenge due to the existing pre-set single carbonation level. Additional details of LTO related features are described in co-pending application Ser. No. 14/947,636, the disclosure of which is herein incorporated by reference thereto.

In some embodiments, an existing beverage dispensing valve may be configured to accept an LTO ingredient, such as through a cartridge, without other equipment, such that the cartridge is a specially designed cartridge to interact with the beverage dispensing nozzle. In some embodiments, an LTO valve, or cartridge itself, may include the carbonation control systems and methods discussed herein.

In some embodiments, an identifier (e.g., barcode, RFID tag, or the like) may be coupled to an ingredient source, and be configured to indicate to the dispenser control attributes such as the volume of liquid to dispense through the syrup containing package, the level of carbonation in a carbonated platform, or the sweetness or brix level for a three stream platform (e.g., concentrate, sweetener, water/carbonated water). In some embodiments, there may be a nutritive or non-nutritive sweetener stream as well as water or carbonated water provided in the beverage. The valve may include additional fluid streams. In some embodiments, the brix level may be controlled, along with carbonation level, and the like.

These and other embodiments are discussed below with reference to the figures. However, those skilled in the art will readily appreciate that the detailed description given herein with respect to these figures is for explanatory purposes only and should not be construed as limiting.

Figure 2:
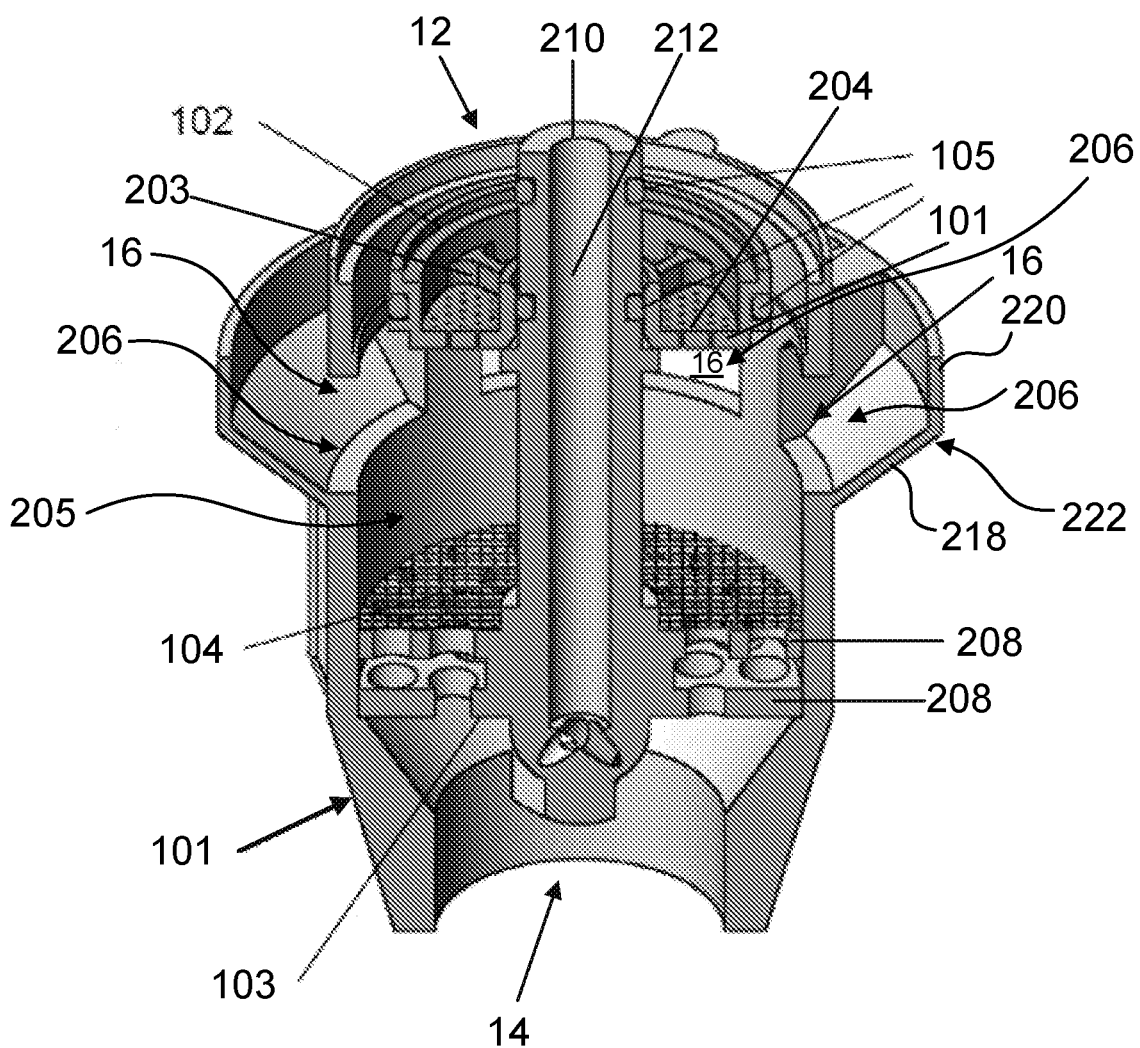
FIG. 2 shows a sectional view of the beverage dispensing nozzle of FIG. 1, taken along line 2-2.
Figure 12:
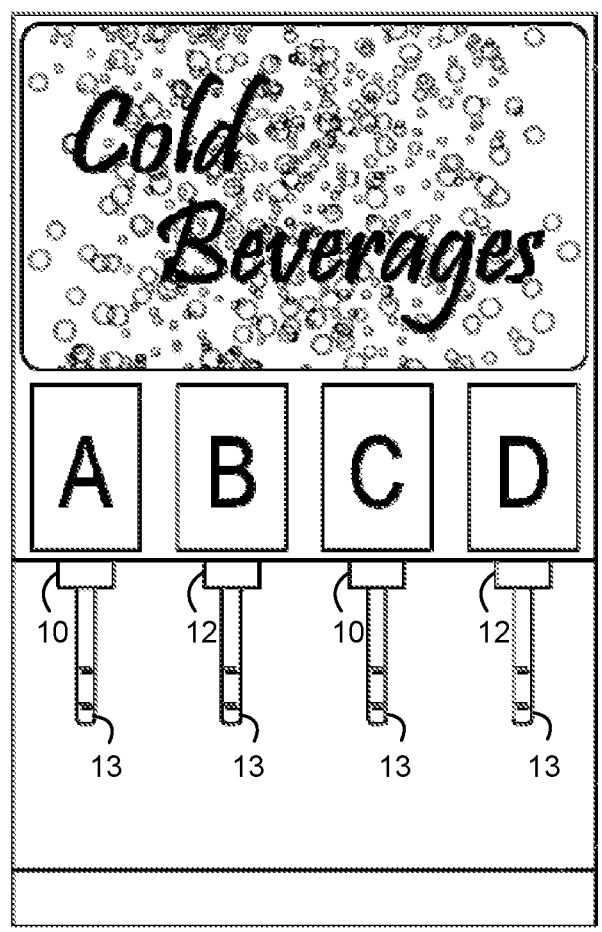
FIG. 12 shows a representative beverage dispensing unit, according to an embodiment.

Referring to FIGS. 1 and 2, a beverage dispensing nozzle 10 is shown, according to an embodiment. In some embodiments, beverage dispensing nozzle 10 includes inlet 12, and outlet 14. In some embodiments, a carbonated beverage ingredient is introduced into inlet 12, passes through beverage dispensing nozzle 10, and exits outlet 14. In some embodiments, inlet 12 includes a conduit 212, configured to allow a beverage ingredient such as syrup to pass through. In some embodiments, inlet 12 allows for a non-carbonated beverage ingredient to pass through, for example, still water. In some embodiments, beverage dispensing nozzle 10 is configured such that the finished beverage exiting outlet 14 is at a lower carbonation level than at inlet 12. In some embodiments, beverage dispensing nozzle 10 includes second outlet 16, further described below. As shown in subsequent figures, beverage dispensing nozzle 10 may be attached to beverage dispensing valve 20 as part of a beverage dispensing system as shown in FIG. 12, described below.

Figure 3:
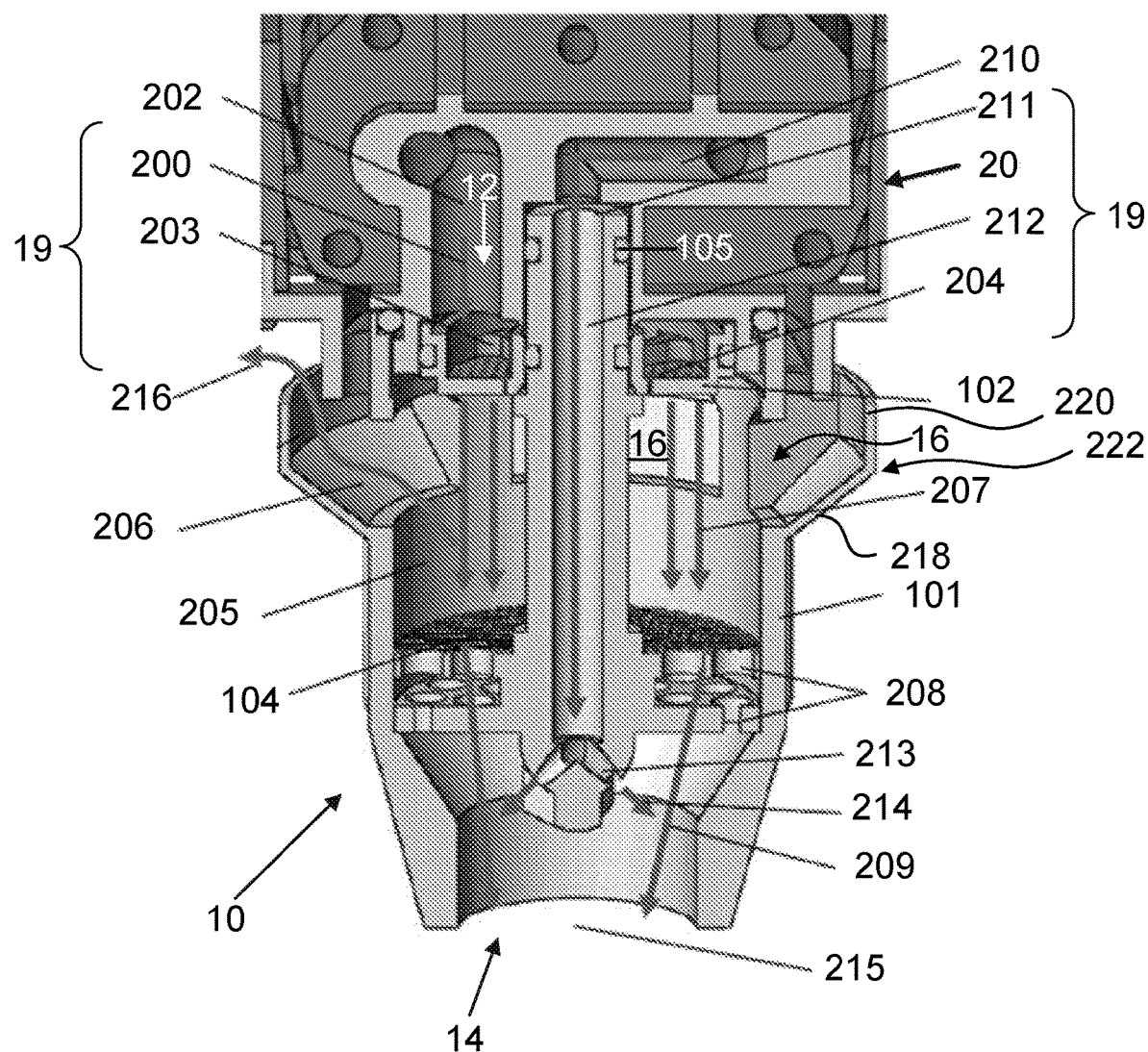
FIG. 3 shows a sectional view of the beverage dispensing nozzle of FIG. 1, coupled to a beverage dispensing valve according to an embodiment.

As shown in FIGS. 2 and 3, for example, in some embodiments, beverage dispensing nozzle 10 includes a nozzle shell 101. In some embodiments, beverage dispensing nozzle 10 further includes a diffuser 102, a baffle 103, a mesh 104, and one or more seals 105. In some embodiments, beverage dispensing nozzle 10 is configured as a kit, for example, a retrofit kit configured to replace an existing nozzle on a beverage dispensing valve 20. As shown, the beverage dispensing nozzle 10 may be attached to beverage dispensing valve 20. In some embodiments, a portion of carbonated water 200 flows through the valve passage 202 to the diffuser cavity 203, where carbonated water 200 flows through diffuser 102.

In some embodiments, diffuser 102 has a plurality of openings 204, through which carbonated water 200 flows. In some embodiments, the number, size, or shape of openings 204 may be selected such that the pressure of the carbonated water in diffuser cavity 203 is between about 5 psig to 45 psig during the beverage dispensing process. In some embodiments, carbonated water 200 flows through openings 204 in the form of water jets 207 (still carbonated) which travel through a nozzle shell internal cavity 205 of nozzle shell 101.

In some embodiments, nozzle shell 101 internal cavity 205 is open to ambient atmosphere with a pressure of about 0 psig, through second outlet 16, which is configured to allow carbon dioxide to vent to atmosphere. In this regard, internal cavity 205 is open to ambient through both second outlet 16 and outlet 14 (e.g., where the finished beverage is dispensed from). In some embodiments, carbon dioxide may be vented to atmosphere by flowing from cavity 205 through aperture 206 disposed in nozzle shell 101. In this manner, aperture 206 provides fluid communication between cavity 205 and ambient air. Aperture 206 may be disposed around a portion of a circumference of nozzle shell 101. Aperture 206 may be a single aperture, or may include a plurality of apertures, as shown in the figures. In some embodiments, aperture 206 may extend as shown and have a generally rectangular projected shape. In some embodiments, additional shapes of aperture 206 may be used. In some embodiments, second outlet 16 (or aperture 206) may be supported by divider 21, which may be in the form of a rib, for example. Divider 21 may be a single divider, which may form a boundary of aperture 206. In some embodiments, divider 21 may include a plurality of dividers 21 disposed circumferentially around nozzle shell 101, and extending radially from a center of nozzle 10. In some embodiments, nozzle shell 101 may include skirt 222, disposed about the nozzle 10. In some embodiments, skirt 222 may include a first sidewall 218, extending upward to a second sidewall 220. Together, sidewalls 218 and 220 may define an intermediate opening that extends radially from the sidewall, open to aperture 206. In some embodiments, divider 21 may include interior surface 22. In some embodiments, interior surface 22 may define a portion of the opening to aperture 206, such that the opening extends through interior surface of nozzle shell 101. In some embodiments, skirt 222 may be configured as a deflection member configured to prevent liquid from being vented through the aperture.

In some embodiments, aperture 206 is disposed between inlet 12 and outlet 14. In some embodiments, aperture 206 is disposed substantially around the entire perimeter of valve 20. In some embodiments, a dimension of aperture 206 is adjustable. In some embodiments, the cross-sectional area of the aperture is adjustable. In some embodiments, aperture 206 has an "open" configuration, wherein the aperture is open to outlet 16 and is configured to reduce carbonation. In some embodiments, aperture 206 has a "closed" configuration, such that the aperture is closed and not open to second outlet 16. In some embodiments, aperture 206 has a "intermediate" configuration between the open and closed configurations, such that a carbonation level or carbonation reduction level can be controlled. In some embodiments, aperture 206 is automatically adjusted to a desired configuration based on the type of beverage to be dispensed. In some embodiments, aperture 206 is disposed around passages 210. In some embodiments, aperture 206 is disposed radially about passages 210.

In some embodiments, the aperture is disposed along a portion of a perimeter of the valve. In some embodiments, the aperture is disposed substantially around the entire perimeter of the valve. In some embodiments, a dimension of the aperture is adjustable. In some embodiments, the cross-sectional area of the aperture is adjustable. In some embodiments, the aperture has an open configuration and a closed configuration.

As shown in FIG. 3, due to the configuration described, the carbonated water 200 experiences rapid pressure drop when it passes through openings 204 from a relatively high pressure region in diffuser cavity 203 to a relatively low pressure nozzle shell cavity 205 (as it is open to ambient pressure environment). This rapid pressure drop promotes $CO_2$ bubble nucleation in the carbonated water 200. As such, the $CO_2$ bubbles grow in size and escape from the carbonated water 200 while it travels through nozzle shell cavity 205. Resulting $CO_2$ gas (represented by path 216) is evacuated through aperture 206, thereby decreasing the carbonation level of the carbonated water 200. The rapid pressure drop in the carbonated water flow at this stage results in nucleation of $CO_2$ bubbles.

Now at a lower carbonation level, in some embodiments, water jets 207 (still carbonated water as flowing from carbonated water 200) flow through mesh 104, further splitting the carbonated water flow into multiple jets. In some embodiments, mesh 104 may interface with baffle 103. In some embodiments, baffle 103 may include one or more perforated discs 208. Perforated discs 208 may be configured to straighten the flow of carbonated water, resulting in a relatively steady uniform flow of carbonated water 209 (still carbonated water as flowing from carbonated water 200), at a relatively lower carbonation level. At this stage, while carbonated water 200 is flowing through nozzle shell cavity 205, the volume of nozzle shell cavity may be increased relative to a standard nozzle cavity, thereby increasing carbonated water flow residence time within the nozzle to encourage $CO_2$ diffusion into the bubbles. Further, the augmented passage to ambient atmospheric conditions provided by second outlet 16 (e.g., apertures 206) provide for the evacuation of $CO_2$ bubbles. Thus, the carbonation level is reduced to a substantially lower value which is suitable for low carbonated soft drinks, sparkling waters, sparkling teas, etc.

In some embodiments, a beverage ingredient, such as a flavored syrup is supplied through the valve passages 210 to baffle opening 211. Baffle opening 210 may include a conduit 212, configured to allow syrup to pass through to a lower portion of baffle 103. Syrup flowing through conduit 212 may exit baffle 103 through openings 213. In some embodiments, openings 213 may be inclined, such that they are mixed with the flow of carbonated water 209. In some embodiments, 4 openings 213 may be included. In some embodiments, the syrup and carbonated water mixture exit through the nozzle shell opening 215 and outlet 14, forming a stream of a finished beverage at a relatively low carbonation level. Nozzle shell opening 215 may be configured as a dispensing portion from which a finished beverage is dispensed. In some embodiments, beverage dispensing valve 20 may also dispense separate ingredients such as fluid or a beverage ingredient separately, for mixing in a cup.

Figure 4A:
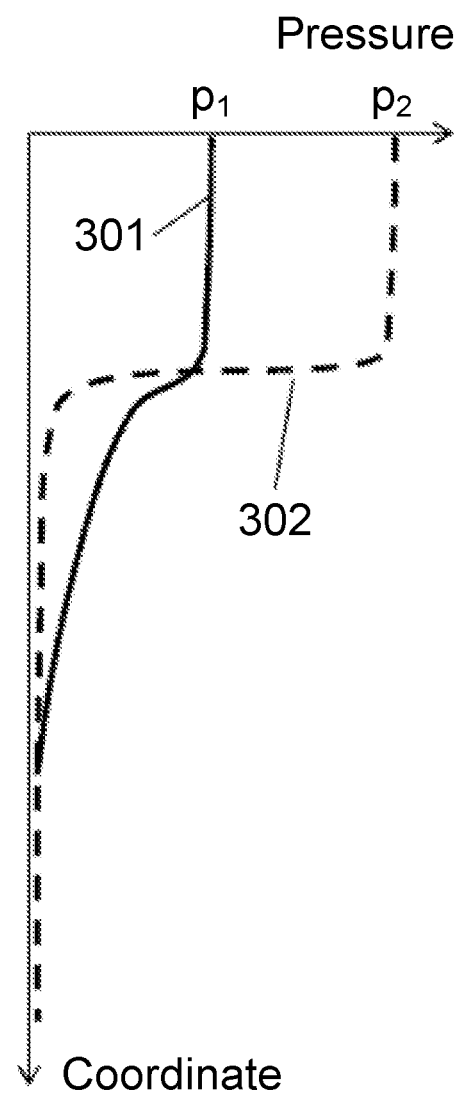
FIG. 4A shows a representative plot of pressure along a fluid path for a representative prior beverage dispensing nozzle as compared to a beverage dispensing nozzle according to an embodiment.
Figure 4B:
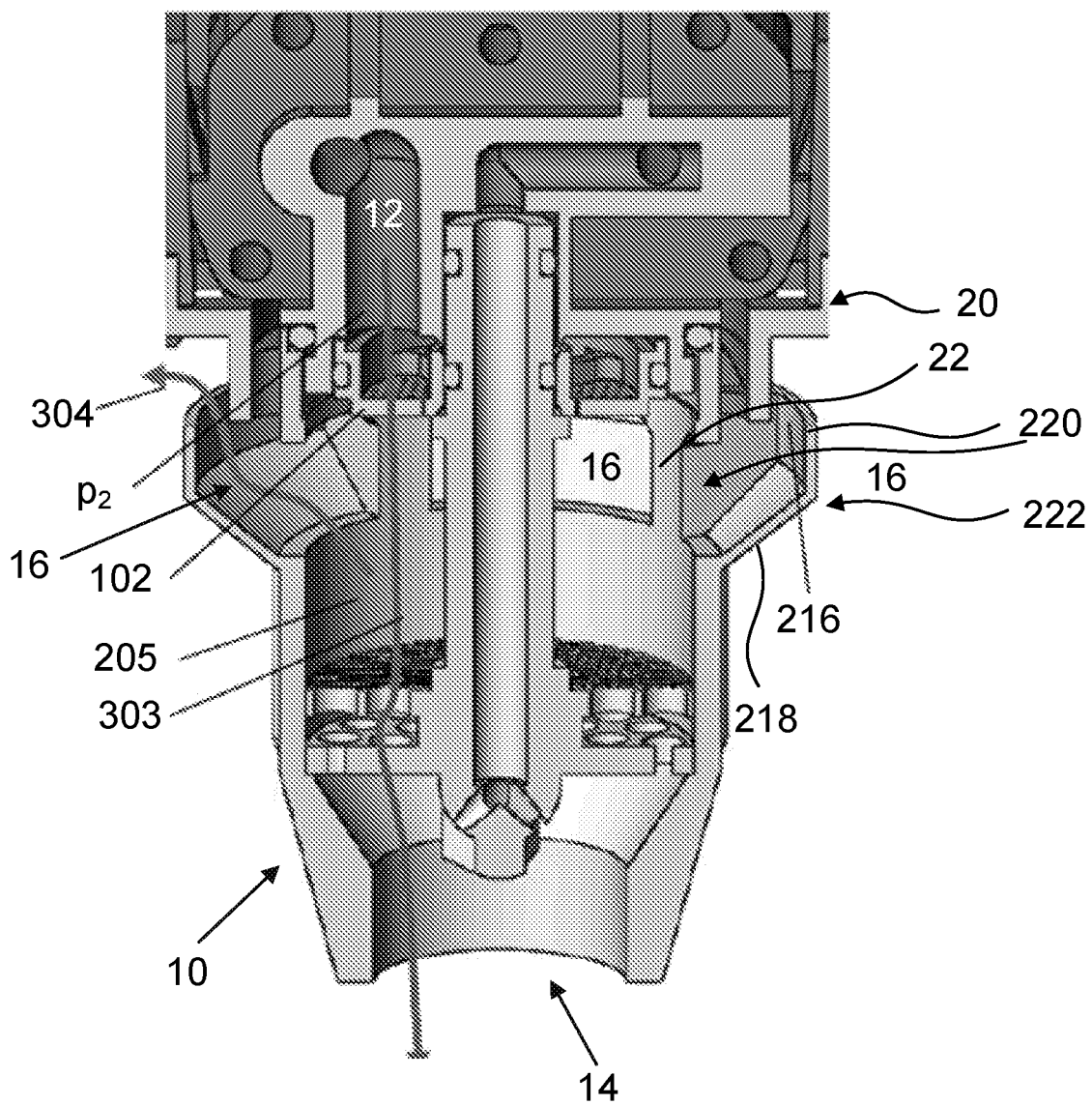
FIG. 4B shows sectional view of the beverage dispensing nozzle of FIG. 1, coupled to a beverage dispensing valve, and exemplary fluid flow path.
Figure 5:
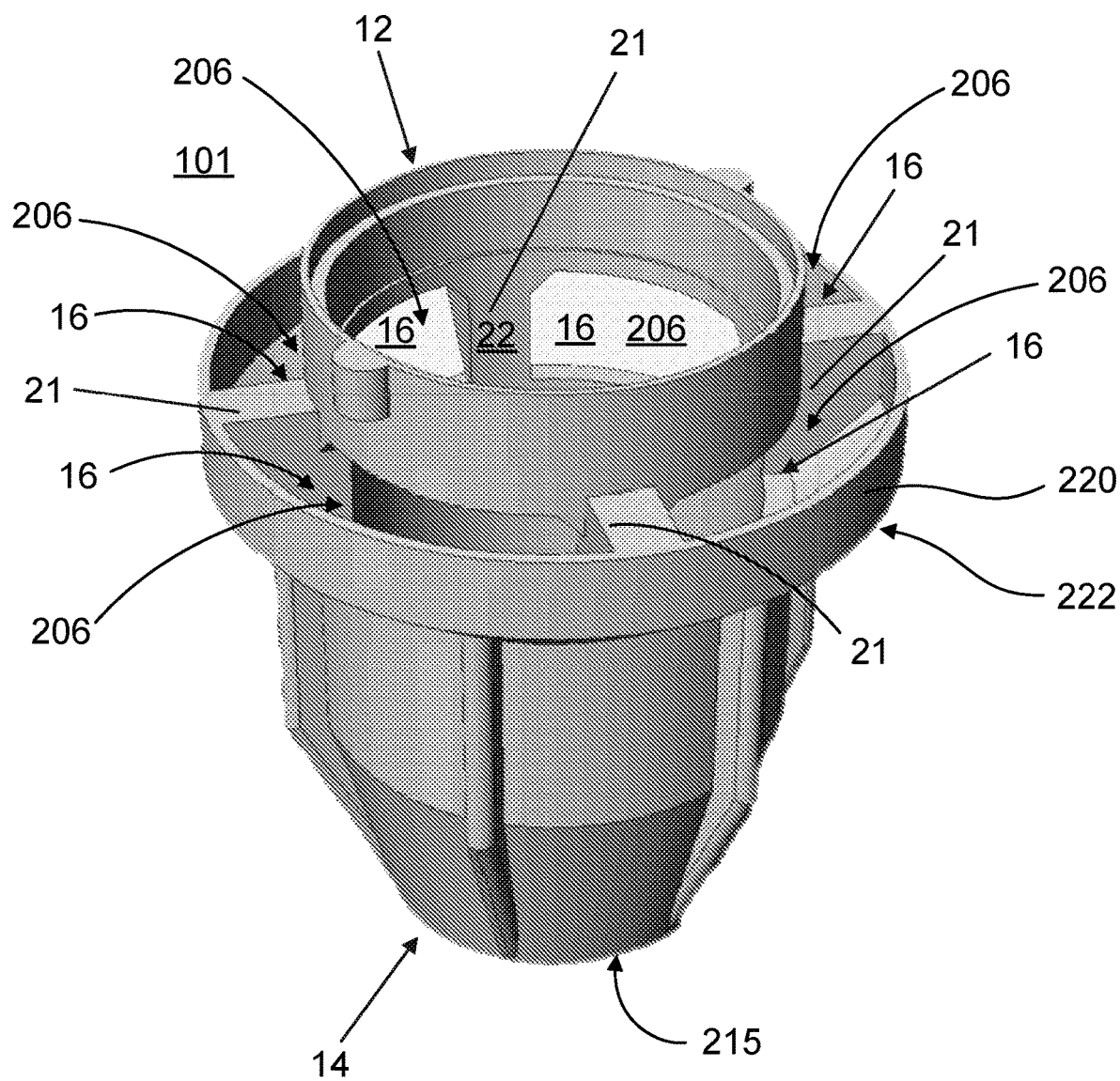
FIG. 5 shows a perspective view of a nozzle shell according to an embodiment.
Figure 6:
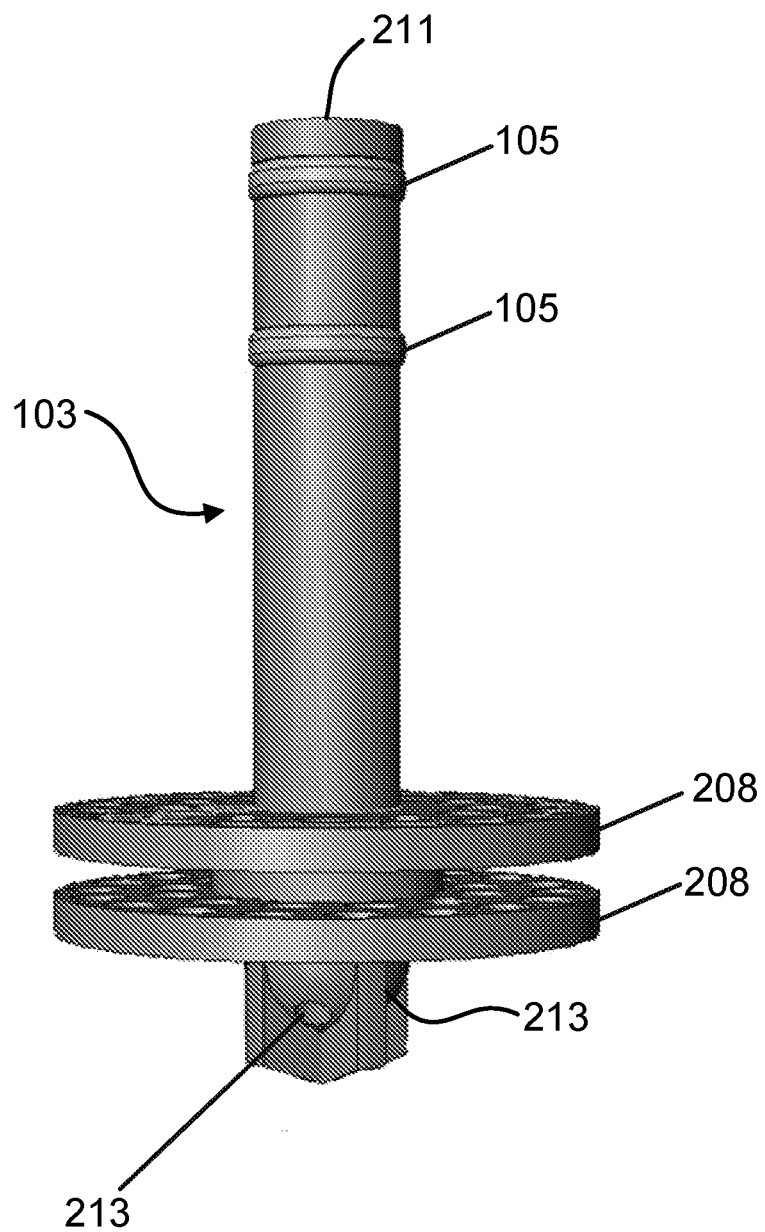
FIG. 6 shows a perspective view of a baffle according to an embodiment.
Figure 7:
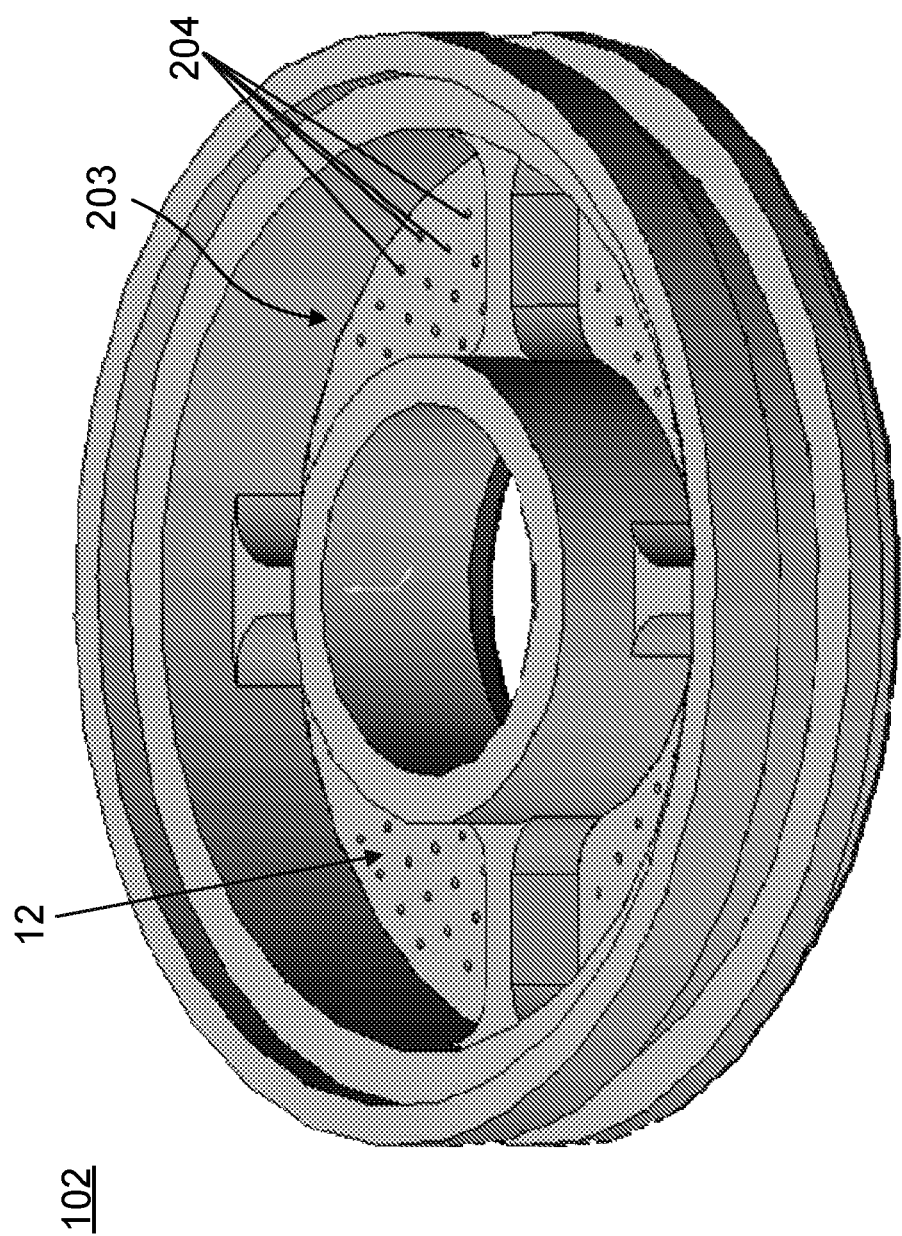
FIG. 7 shows a perspective view of a diffuser according to an embodiment.
Figure 8:
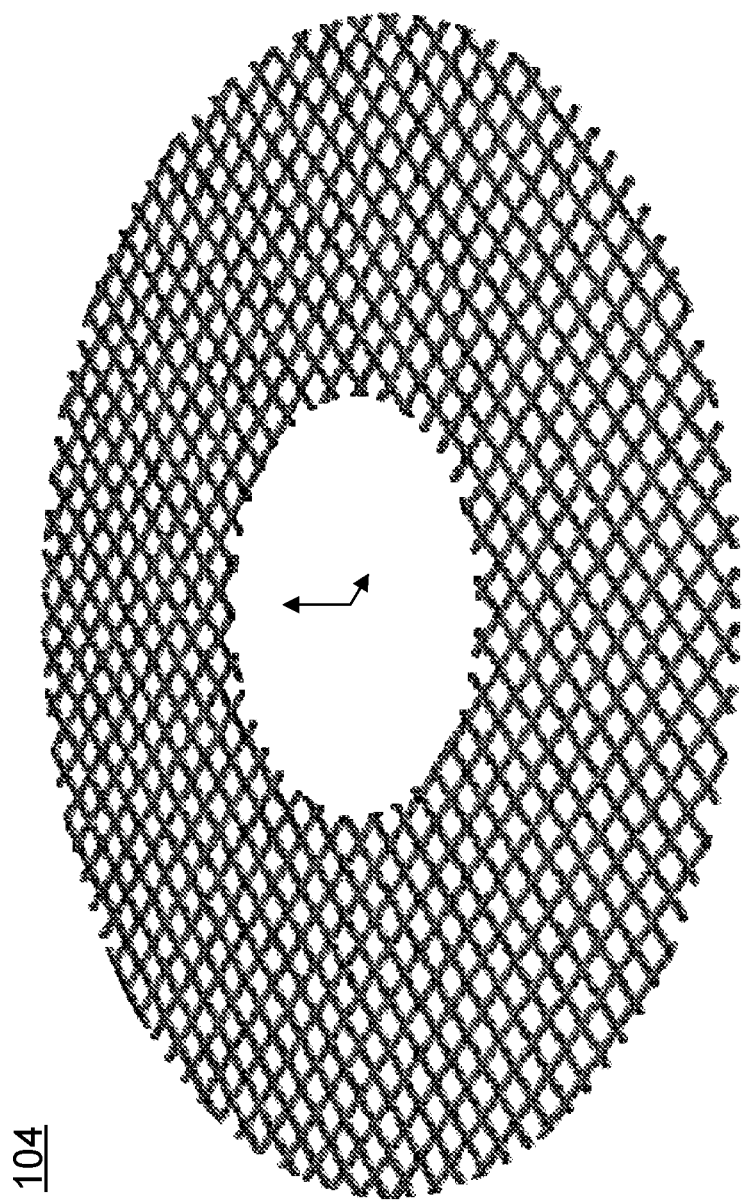
FIG. 8 shows a perspective view of a mesh according to an embodiment.

To further illustrate the advantages of the present beverage dispensing nozzles, systems, and methods, FIGS. 4A-4B illustrate the relative carbonation level control from a previous dispensing nozzle. FIG. 4A shows a diagram of relative pressure distribution in the carbonated water flowing through a prior flow path of a dispensing nozzle not having the carbonation reduction features of embodiments discussed herein (represented by line 301) and the beverage dispensing nozzle 10 (represented by line 302). The location of the lines along the vertical axis of the nozzles approximately corresponds to the location along the nozzle vertical axis where the pressure is measured. Prior representative flow path of carbonated water is represented by "$p_1$", and as shown in FIG. 4B, beverage dispensing nozzle 10 is shown coupled to beverage dispensing valve 20, showing path "$p_2$" of carbonated water—as shown, flow path extends from inlet 12, through the prior art nozzle and through outlet 14.

As shown in FIG. 4A, relatively higher pressure exists in the cavity above the diffuser 102, relative to the same position in the prior art nozzle (e.g., p2>p1 at the corresponding location at inlet 12). FIG. 4A shows a relatively rapid pressure drop when carbonated water passes through diffuser 102 and enters nozzle shell cavity 205 (e.g., at location 303). As shown and described above, nozzle shell 101 includes nozzle shell cavity 205, which is open to atmosphere through aperture 206. In this regard, aperture 206 provides a sharp drop in pressure p2 and promotes a high degree of carbon dioxide nucleation. As shown, representative flow path of carbon dioxide 304 is allowed to exit beverage dispensing nozzle 10 prior to outlet 14. In this regard, the carbonation level is reduced, as compared to the prior flow path, which has no alternative outlet or apertures other than outlet 14. FIG. 4A, a representative standard prior art dispensing nozzle is shown, showing representative pressure distribution "$p_1$" of carbonated water. As shown, flow path extends from inlet 12, through the prior art nozzle and through outlet 14.

In some embodiments, as shown in FIGS. 4A and 4B, and described above, the carbonated water may also have increased residence time within the beverage dispensing nozzle 10 while exposed to atmospheric pressure—this may be achieved by increased vertical dimension or volumetric dimension relative to the prior nozzle of nozzle shell chamber 205.

In some embodiments beverage dispensing nozzle 10 is configured to be adjustably mounted to a frame or housing of a beverage dispensing valve 20, or to a beverage dispenser or dispensing system.

In some embodiments, an upper portion of the beverage dispensing nozzle 10 has the necessary shape and features for securely coupling to a standard, available dispensing valve (e.g., UFB Valve, IMI Cornelius, Inc.).

Figure 9:
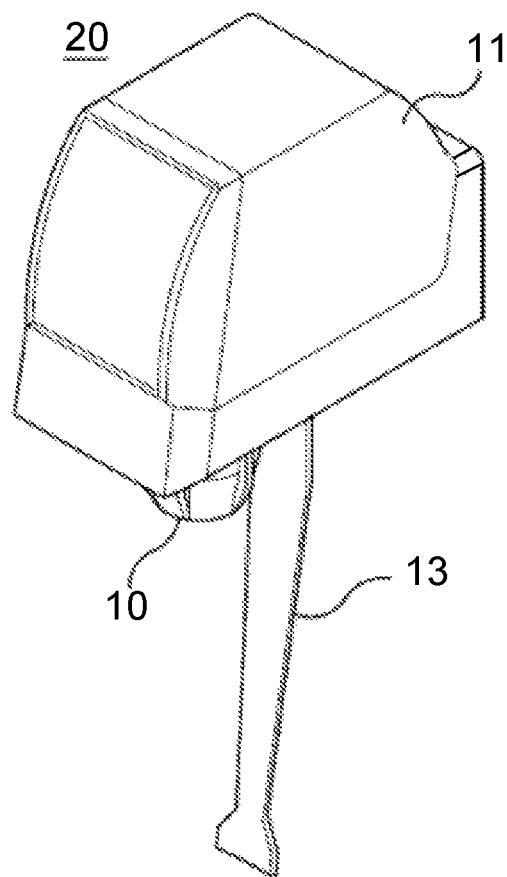
FIG. 9 shows a front right perspective view of a beverage dispensing valve according to an embodiment.
Figure 10:
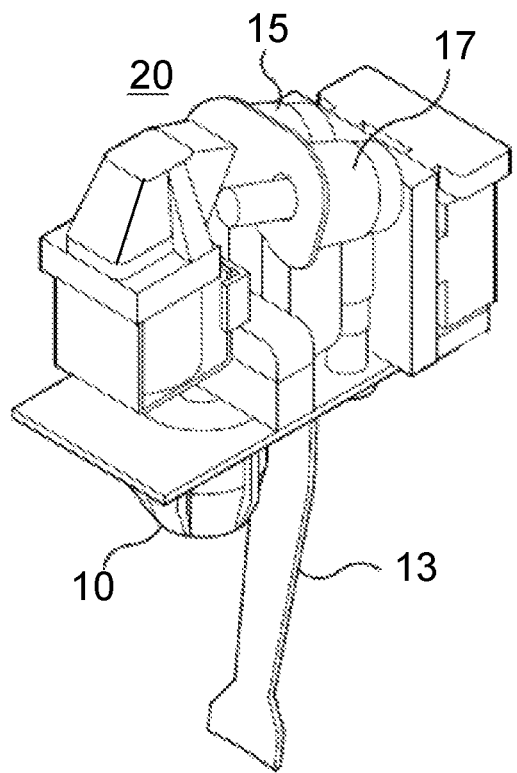
FIG. 10 shows a front right perspective view of a beverage dispensing valve with a housing removed to show internal components according to an embodiment.

As shown in FIGS. 3, 9, and 10, for example, beverage dispensing nozzle 10 may be coupled directly to beverage dispensing valve 20, including seal 105. In some embodiments, the sealing surfaces may be reversed. In some embodiments, beverage dispensing nozzle 10 and beverage dispensing valve 20 may be coupled at interface region 19, as shown in FIG. 3. In some embodiments, interface region 19 may include additional components, such as an adaptor, locking mechanism, guiding mechanism, or the like. In some embodiments, interface region 19 may include a portion of second outlet 16, or aperture 206, such that the coupling of beverage dispensing nozzle 10 and beverage dispensing valve 20 effectuates the evacuation of the carbon dioxide to lower the relative carbonation level of the finished beverage.

In some embodiments, beverage dispensing nozzle 10 may be threaded to beverage dispensing valve 20. In some embodiments, an intermediate structure may be included, such that beverage dispensing nozzle 10 may only be applied to particular beverage dispensing valves 20. In this way, switching of beverage dispensing nozzle 10 does not require expertise of a technician, for example.

FIGS. 5-8 show perspective component views of components previously discussed for clarity.

FIGS. 9 and 10 show a beverage dispensing valve 20 according to an embodiment. In some embodiments, beverage dispensing valve 20 may be a post-mix valve. As shown, beverage dispensing valve 100 may include a beverage dispensing nozzle 10, a housing 11, and an actuator 13 which may activate a beverage dispensing function of a beverage dispenser. FIG. 10 shows beverage dispensing valve 20 of FIG. 9 with housing 11 removed. Beverage dispensing valve 10 may have a first regulator 15 and a second regulator 17. In some embodiments, there may be included additional regulators. Regulators 15 and 17 may be fluid regulators, and may regulate fluid flow, such as a still or carbonated water component and a beverage ingredient such as syrup. In some embodiments regulators 15/17 may regulate flow of other beverage ingredients, such as powder or the like.

In some embodiments, fluid regulator 15 controls flow of a fluid (e.g., still or carbonated water) pushed through beverage dispensing nozzle 10, thereby mixing a beverage ingredient and fluid to produce a finished beverage. In some embodiments, a first fluid regulator 15 controls fluid flow of a fluid (e.g., still or carbonated water) pushed into beverage dispensing nozzle 10 and a second fluid regulator 17 suctions beverage ingredient from a source and into nozzle 10, thereby mixing the beverage ingredient and fluid to produce a finished beverage. In some embodiments, fluid regulators 15/17 may be valves, orifices, or the like, and may be mechanically or electrically operated, for example. In some embodiments a pump or impeller may be coupled to the regulator and may be configured to increase or decrease flow rate according to beverage mixing parameters. In some embodiments, the fluid and beverage ingredient may be mixed within the nozzle or valve components. In some embodiments the fluid and beverage ingredient may be mixed once dispensed into a container such as a cup or mug.

In some embodiments, beverage dispensing nozzle 10 may be integrated in the beverage dispensing valve 20. In some embodiments, the action of positioning (e.g., lowering and raising) beverage dispensing nozzle 10 into position may be automated using one or more actuation components, such as, for example, electric motors, solenoids, and the like that are operatively connected to beverage dispensing valve 20, or the dispenser itself. In some embodiments, the action of positioning beverage dispensing nozzle 10 may be facilitated mechanically, such as by springs or compressible pistons. The electrical, mechanical, or electro-mechanical actuation components may be disposed in beverage dispensing valve 20 or another dispensing system component, or a structure adjacent the beverage dispensing valve 20, including, but not limited to, a wall, countertop, table, or housing.

Some embodiments are drawn towards a method for producing a beverage, including flowing carbonated water through an inlet of a beverage dispenser valve, lowering the pressure of the carbonated water sufficient to promote carbon dioxide nucleation, flowing the carbonated water through a chamber vented to ambient pressure environment such that a portion of carbon dioxide nucleated is off-gassed, and introducing a beverage ingredient when the carbonated water reaches a sufficiently low carbonation level. In some embodiments, the carbonation level is between about 1 gas volumes and 4.2 gas volumes. In some embodiments, the chamber vented to ambient pressure environment is disposed in a portion of a beverage dispensing nozzle. In some embodiments, lowering the pressure of the carbonated water is effected by passing the carbonated water through a diffuser and into the chamber vented to ambient pressure environment. In some embodiments, the carbon dioxide nucleated is off-gassed through an aperture disposed in a portion of a beverage dispensing nozzle.

Figure 11:
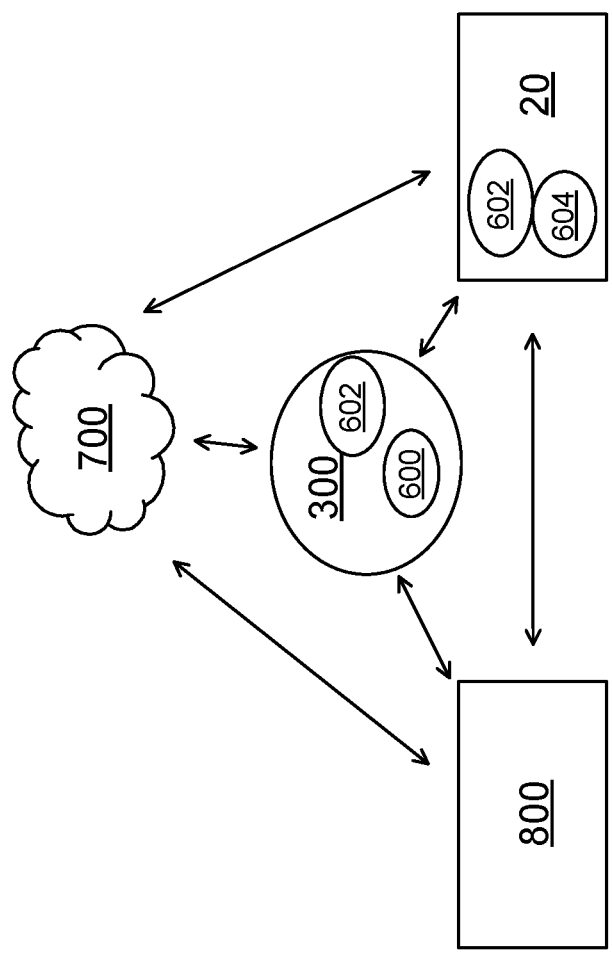
FIG. 11 shows a schematic view of a beverage dispensing valve system with various communication components according to an embodiment.

As shown in FIG. 11, for example, in some embodiments, beverage dispenser 300 or beverage dispensing valve 20 may include a receiver and/or transmitter 602 that may communicate with a customer device 800 (e.g., phone, smartphone, tablet, smart watch, etc.). In some embodiments, this communication may provide customization according to prior customer preferences. For example, when a consumer is within a relatively close distance to the dispenser 300, such as within a retail location, or travelling near a particular restaurant with dispenser, the consumer may receive a message on their device 800 with information on special LTOs, promotions, special flavors available in dispenser 300, or the like. In another example, a consumer may prefer Beverage A, when a consumer is within a relatively close distance to the dispenser 300, the consumer may receive a message on their device 800 informing the consumer where a dispenser 300 containing ingredients to make Beverage A may be found and/or purchased. In some embodiments, this communication may include instructions on how to use system, or may include a transactional component, for example, purchasing a beverage through a user interface on the consumer's device 800. In some embodiments, the overall system may include a network 700, such as, for example, a cloud or Internet such that device 800 and/or components of the dispenser 300 or beverage dispensing valve 20 may communicate over the network 700. In some embodiments, receiver/transmitter 602 associated with dispenser 300 may communicate with receiver/transmitter 602 associated with beverage dispensing valve 20. In some embodiments, receiver and/or transmitter 602 may communicate with device 800. Communication between the components shown in FIG. 11 may be one-way or multi-way communication. In some embodiments, certain components shown in FIG. 11 may be omitted.

Examples of various social media and other communication features available for incorporation to the instant systems and methods can be found in U.S. Patent Application Publication No. 2013/0096715, which is hereby incorporated by reference in its entirety. For example, in some embodiments, the systems may be configured to receive instructions in connection with a gift a beverage from one individual to another individual, or provide an interface that allows a recipient of a gift, coupon, or promotion, to hear and/or see an audio, text, and/or video message, such as a message of the party who sent the gift, coupon, or promotion to the recipient, for example between multiple devices 800 as shown in FIG. 11.

As shown in FIG. 11, in some embodiments, the beverage dispensing valve 20 or dispenser 300 may be configured to communicate with a mobile device 800 of a customer and/or a mobile software application used by a customer. Thus, the beverage dispensing valve 20 or dispenser 300 may be configured to determine whether a particular customer has ordered and/or has paid for a particular beverage and/or has redeemed a coupon, promotion, etc., that entitles the customer to receive the beverage. As shown in FIG. 11, for example, beverage dispensing valve 20 may include a communication device 604, which may be, for example a transceiver or reader, and may read for example an identifier 600, such as a barcode, an active or passive RFID tag, or the like. In some embodiments, communication device 604 is configured to communicate with another transceiver or communication device. In some embodiments, the communication device 604 may enable detection of code(s), check-in(s), and/or other awareness of certain electronic device(s) 800 of a user, e.g., a mobile communication device(s) 800, and may enable communication with such an electronic device(s) 800. In some embodiments, the system may be used to create a partnership, including a campaign, with philanthropic organizations and/or activities. In some embodiments, the system may be configured to automatically provide a beverage promotion or discount to a customer upon identification of the customer.

As discussed above, and further shown in FIG. 11, for example, an identifier 600 (e.g., barcode, an active or passive RFID tag, or the like) may be coupled to the a cup, bag-in-box system, or LTO cartridge, for example, and may be configured to indicate to the dispenser control attributes such as the volume of liquid to dispense through the syrup containing package, the level of carbonation in a carbonated platform, or the sweetness or brix level for a three stream platform (e.g., concentrate, sweetener, water/carbonated water). In some embodiments, information regarding identifier 600 may be communicated to the consumer through their device 800. In some embodiments, the identifier 600 may be selected by the consumer through their device 800, and communicated to the system for use in preparing the beverage.

In one embodiment, identifier 600 (e.g., barcode, an active or passive RFID tag, or the like) may be coupled as described above such that a communication device 604, such as a reader associated with beverage dispensing valve 20 may read identifier 600 and configure the valve 20 based on the fact that the identifier 600 is within a predetermined range. For example, as a consumer approaches the beverage dispensing valve 20, the reader 604 may read the identifier 600 and configure the position, shape, or size of aperture 16. In this manner, the system 200 may maintain a "default" or "relatively high carbonation" position while not in use and activate to an "on" or "reduced carbonation" position when a consumer approaches the system with to dispense a particular beverage. In some embodiments, this function may be performed by the communication between device 800, dispenser 300 and/or beverage dispensing valve 20, with their respective transmitters and/or receivers 602, or an additional network 700.

In some embodiments, the interfaces and communication between systems 200 and/or devices may be networked together through a communications network. Communications network may include, for example: 1) a local area network (LAN); 2) a simple point-to-point network (such as direct modem-to-modem connection); and/or 3) a wide area network (WAN), including the Internet and other commercial based network services. In one aspect, the interfaces and/or devices may be connected to social media computer through communications network or using various protocols, such as TCP/IP, Ethernet, FTP, HTTP, BLUETOOTH, Wi-Fi, ultra wide band (UWB), low power radio frequency (LPRF), radio frequency identification (RFID), infrared communication, IrDA, third-generation (3G) cellular data communications, fourth-generation (4G) cellular data communications, Global System for Mobile communications (GSM), or other wireless communication networks or the like may be used as the communications protocol. The interfaces and communication between systems and/or devices may be physically connected to each other or one or more networks via twisted pair wires, coaxial cable, fiber optics, radio waves or other media. In an aspect, known standard protocols may be used, including Flash, HTML5, etc.

The term "network" as used herein and depicted in the drawings should be broadly interpreted to include not only systems in which remote storage devices are coupled together via one or more communication paths, but also stand-alone devices that may be coupled, from time to time, to such systems that have storage capability. Consequently, the term "network" includes not only a "physical network" but also a "content network," which is comprised of the data—attributable to a single entity—which resides across all physical networks. A "network," as used herein, may also include a network of "virtual" servers, processes, threads, or other ongoing computational processes which communicate with each other, some or all of which may be hosted on a single machine which may provide information to client servers, processes, threads or other ongoing computational processes on that same machine, other machines, or both.

As shown in FIG. 12, a beverage dispensing unit 1000 is shown, including multiple beverage dispensing valves having actuators 13. As shown, in some embodiments, beverage dispensing unit 1000 may be configured to dispense several different beverages or types of beverages (e.g., Beverage A, Beverage B, Beverage C, and Beverage D.) In some embodiments, Beverages A and C for example may have a flavor profile that includes a lower carbonation level, such that nozzle 10 may be used. As shown, Beverages B and D may not require a lower carbonation level, such that nozzle 12 may be used, which may not include the carbonation reduction features described herein (e.g., aperture 206). In some embodiments, each of the valves may use nozzle 10. In some embodiments, one or more valves may use nozzle 10. In some embodiments, all or some of the valves may include one or more carbonation reduction features described herein.

The foregoing descriptions of the specific embodiments described herein are presented for purposes of illustration and description. These exemplary embodiments are not intended to be exhaustive or to limit the embodiments to the precise forms disclosed. All specific details described are not required in order to practice the described embodiments.

It will be apparent to one of ordinary skill in the art that many modifications and variations are possible in view of the above teachings, and that by applying knowledge within the skill of the art, one may readily modify and/or adapt for various applications such specific embodiments, without undue experimentation, without departing from the general concept of the present invention. Such adaptations and modifications are intended to be within the meaning and range of equivalents of the disclosed embodiments, based on the teaching and guidance presented herein.

The Detailed Description section is intended to be used to interpret the claims. The Summary and Abstract sections may set forth one or more but not all exemplary embodiments of the present invention as contemplated by the inventor(s), and thus, are not intended to limit the present invention and the claims.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The phraseology or terminology used herein is for the purpose of description and not limitation, such that the terminology or phraseology of the present specification is to be interpreted by the skilled artisan.

The breadth and scope of the present invention should not be limited by any of the above-described exemplary embodiments, but should be defined in accordance with the claims and their equivalents.

What is claimed is:

1. A method for dispensing a beverage, comprising:
flowing carbonated water through an inlet of a beverage dispenser valve;
flowing the carbonated water through a diffuser disposed downstream of the inlet, wherein the diffuser comprises a plurality of openings that the carbonated water flows through;
lowering the pressure of the carbonated water to a level sufficient to promote carbon dioxide nucleation by passing the carbonated water from the diffuser into a nozzle shell chamber vented to ambient pressure environment through an aperture disposed upstream of the nozzle shell chamber such that a portion of nucleated carbon dioxide is off-gassed; and
introducing a beverage ingredient after the carbonated water has passed through the nozzle shell chamber, wherein the carbonated water reaches a sufficiently low carbonation level after passing through the nozzle shell chamber.

2. The method of claim 1 wherein the carbonation level is between about 1 gas volumes and 4.2 gas volumes, wherein one gas volume equals the volume of carbon dioxide gas at 32 degrees Fahrenheit and one atmosphere of pressure.

3. The method of claim 1, wherein the nozzle shell chamber vented to ambient pressure environment is disposed in a portion of a beverage dispensing nozzle.

4. The method of claim 1, wherein lowering the pressure of the carbonated water is effected by passing the carbonated water through the diffuser and directly into the nozzle shell chamber vented to ambient pressure environment.

5. The method of claim 1, wherein the pressure drop between the inlet and nozzle shell chamber is between about 5 gauge pounds per square inch and 45 gauge pounds per square inch.

6. The method of claim 1, wherein the aperture is disposed along a portion of a perimeter of the beverage dispenser valve.

7. The method of claim 1, further comprising providing a deflection member disposed between the nozzle shell chamber and the aperture that prevents liquid from being vented through the aperture.

8. A method for dispensing a beverage, comprising:
flowing carbonated water through an inlet of a beverage dispenser valve;
increasing a pressure of the carbonated water by flowing the carbonated water through a diffuser disposed downstream of the inlet;
decreasing the pressure of the carbonated water by flowing the water from the diffuser directly to a chamber with a volume sufficient to promote carbon dioxide nucleation;
venting carbon dioxide gas that has nucleated from the carbonated water in the chamber upwards through an aperture that connects the chamber to ambient atmosphere;
adding a beverage ingredient to the carbonated water after the carbonated water has passed through the chamber;
dispensing the carbonated water and the beverage ingredient from a nozzle located downstream of the chamber and the aperture.

9. The method of claim 8, wherein the chamber is a nozzle shell chamber and wherein the aperture is disposed between the nozzle shell chamber and the diffuser.

10. The method of claim 8, wherein flowing the carbonated water through the diffuser comprises flowing the carbonated water through a plurality of openings in the diffuser such that the plurality of openings restrict the flow of the carbonated water and thereby raise the pressure of the carbonated water.

11. The method of claim 9, further comprising providing a deflection member disposed between the nozzle shell chamber and the aperture that prevents liquid from being vented through the aperture.

12. The method of claim 9, wherein the pressure drop between the inlet and the nozzle shell chamber is between about 5 gauge pounds per square inch and about 45 gauge pounds per square inch.

13. The method of claim 8, wherein the aperture is disposed along a portion of a perimeter of the beverage dispenser valve.

14. The method of claim 13, wherein the aperture is disposed substantially around the entire perimeter of the beverage dispenser valve.

* * * * *